US009521827B2

(12) United States Patent
Houston

(10) Patent No.: US 9,521,827 B2
(45) Date of Patent: Dec. 20, 2016

(54) FENCE POST INSULATOR APPARATUS AND METHODS

(71) Applicant: Norman DeVerne Houston, Neosho, MO (US)

(72) Inventor: Norman DeVerne Houston, Neosho, MO (US)

(*) Notice: Subject to any disclaimer, the term of this patent is extended or adjusted under 35 U.S.C. 154(b) by 0 days.

(21) Appl. No.: 14/207,533

(22) Filed: Mar. 12, 2014

(65) Prior Publication Data

US 2014/0312288 A1 Oct. 23, 2014

Related U.S. Application Data

(60) Provisional application No. 61/801,655, filed on Mar. 15, 2013.

(51) Int. Cl.
*E04H 17/12* (2006.01)
*A01K 3/00* (2006.01)

(52) U.S. Cl.
CPC ............... *A01K 3/005* (2013.01); *E04H 17/12* (2013.01); *Y10T 29/49227* (2015.01)

(58) Field of Classification Search
CPC ....... A01K 3/005; H01B 17/16; H01B 17/145; E04H 17/10; E04H 17/12
USPC .................................. 256/10, 48; 174/163 F
See application file for complete search history.

(56) References Cited

U.S. PATENT DOCUMENTS 2,429,857 A * 10/1947 Verner ...................... 174/161 F
2,537,719 A * 1/1951 Tuepker ...................... 174/45 R
2,858,106 A * 10/1958 Anton et al. .................. 254/389
2,896,011 A * 7/1959 Huseby ...................... 174/163 F
2,947,055 A * 8/1960 McHenry ...................... 403/396
3,654,383 A * 4/1972 Wilson ...................... 174/163 F
3,809,371 A * 5/1974 Martini ........................... 256/47
4,077,611 A * 3/1978 Wilson ........................... 256/10
4,845,317 A * 7/1989 Wilson, Jr. ................ 174/163 F
5,920,036 A * 7/1999 Egger ....................... 174/161 F
6,353,187 B1 * 3/2002 Wilson, Jr. ................ 174/158 F
6,543,750 B1 * 4/2003 Calzone ............................ 256/1
6,960,728 B1 * 11/2005 Halderman ............... 174/158 F
7,500,653 B1 3/2009 Hartman et al.
8,141,853 B2 * 3/2012 Malins ............................ 256/10
2014/0138891 A1 * 5/2014 Perry .............................. 269/46

FOREIGN PATENT DOCUMENTS

FR 2001372 * 9/1969 ............ H01B 17/00
FR 2938402 A1 * 5/2010 ............... A01K 3/00

* cited by examiner

*Primary Examiner* — Joshua Kennedy
(74) *Attorney, Agent, or Firm* — Bruce E. Houston

(57) ABSTRACT

An electric fence insulator is formed as a flexible band of material with an opening along a lateral periphery. The band is flexed to position around the perimeter of a fence post along a length of the fence post as determined by the length of the insulator. The insulator provides electrical insulation between an electrically energized fence wire and a point of contact of the wire with a grounded fence post. The insulator includes a fastener at the opening to close to a secure position using a simple clipping motion after the insulating band is positioned on the fence post at a selected height. The insulator forms a minimal lever arm between the fence post and the energized wire. The insulator may be retrofitted to existing installations with fence wire already installed without a need to access the fence post from the top to the section requiring electrical insulation.

10 Claims, 4 Drawing Sheets

FENCE POST INSULATOR APPARATUS AND METHODS

PRIORITY CLAIM

This application claims the benefit of priority under 35 U.S.C. §119(e) to U.S. Provisional Patent Application Ser. No. 61/801,655 titled "T-Post Insulator Apparatus and Methods" filed on Mar. 15, 2013 and incorporated herein by reference in its entirety.

TECHNICAL FIELD

Embodiments described herein relate to fencing apparatus and methods, including electric fencing insulators and methods of manufacture thereof.

BACKGROUND INFORMATION

Fencing materials and methods have developed over hundreds and thousands of years and continue to evolve. Fencing is used to contain livestock, to maintain a separation between species, to exclude livestock and other animals from crops, etc. Fence posts and fencing material between posts may be constructed of a variety of materials including wood, steel, composites, and others. A combination often-used in modern farm and ranching operations is steel fence posts supporting various types and numbers of strands of wire strung between posts. Straight or barbed wire may be used, for example. Barbed wire may deter animal crossing as it is sharp and may be painful for an animal attempting to cross a barbed-wire fence. Another technique that may be effective using a small number of strands is electric fencing. One or more electrically conductive strands are energized at a high voltage but are current-limited to create a strong electric shock without harming an animal attempting to cross. One complicating factor with electric fencing is the need to electrically insulate each energized strand of wire and any conductive retaining wires used to fasten the energized strand at each fence post to prevent current leakage to ground through the fence post.

The steel t-post is a fence post designed for wire fencing. FIG. 1 is a prior-art diagram of an example section 100 of a fencing t-post. Generally speaking, the t-post takes its name from its cross-sectional shape. A flat vertical member 110 orthogonally abuts a cross member 120 approximately halfway across the width of the cross member 120 at a junction 130. The junction 130 runs the length 140 of the section oft-post 100.

Some t-post designs may also have a series of nubs (e.g., the nub 150) protruding from the cross member 120 on the side of the cross member 120 opposite the junction 130 of the vertical member 110 and the cross member 120. Some t-posts may be designed with extensions 120A and 120B of the cross member 120 extending from the flat vertical member 110 at an angle other than 90 degrees. Other t-posts may be designed with the extensions 120A and 120B curved slightly toward the nubs 150, forming a concave area populated by the nubs 150 along the length of the t-post. Each of several fencing wires is generally positioned at the bottom of an appropriate nub. The fencing wire is fastened at that position along the length 140 using a separate retaining wire wrapped around the fence wire and the edges of the vertical member 110 and the two edges of the cross member 120. The nubs in conjunction with the retaining wire thus alleviate vertical slippage of the fencing wire along the length of the t-post.

In some cases, t-posts are used to implement electric fences. In that case, an insulator is required to be fitted to each section oft-post at points touched by an electric fence wire to be energized and/or by a conductive retaining wire wrapped around the fencing wire and the fence post. Insulators may be fabricated from various electrically insulating materials including glass and plastic. Plastic insulators are known which snap around the two edges of the extensions 120A and 120B of the cross member 120 and extend outward from the wire surface side 170 of the t-post 100. Such insulators thus form a lever arm outward from the t-post surface 170. Livestock may come into contact with and dislodge such "extension type" insulators from the t-post due to the lever arm effect.

"Sleeve" type insulators are also known. Such insulators slide down from the top of the fence post during installation and prior to fastening the fencing wires to the fence post.

SUMMARY OF THE INVENTION

Apparatus and methods described herein provide electrical insulation between an electrically energized fencing wire and a point of contact of the wire with a grounded fence post. Insulators disclosed herein form a band of electrically insulating material with a lateral opening to position around a periphery of the fence post and along a length of the fence post as determined by the length of the insulator. Embodiments of the disclosed apparatus include a fastener at the opening. The fastener is snapped to a secure closed position using a simple clipping motion after the insulator is positioned around the fence post at a selected height along the fence post length. Embodiments of the disclosed electric fence insulator thus form a minimal lever arm between the fence post and the energized wire and are more mechanically secure than prior-art devices as a result.

Additionally, disclosed embodiments of the insulator may be retrofitted to existing installations with fencing wire already installed. It may be advantageous to install a fence post insulator without the need to access the length of the fence post from the top of the post to the section requiring electrical insulation. For example, an electric fence requiring repair may simply need an insulator replaced at a wire other than the top wire. Wires and other hardware above the point of repair may prevent sliding an insulator onto the fence post from the top of the fence post.

Some embodiments described herein, or portions of such embodiments, may be fabricated from a stretchable band of electrically insulating material such that, when fastened around a section of a fence post as described above, may contact only convex portions of the fence post cross section and leave a gap between the fence post and the band of insulating material along concave portions of the fence post as viewed in cross-section.

Some examples described and illustrated herein refer to embodiments used with t-post types of fence posts. However, embodiments of the invention are not limited to use with t-posts. The invented insulator may be formed in any shape to conform to or be positioned around the cross-sectional shape of any fence post, whether metallic, wooden, composite, or fabricated from some other material.

DETAILED DESCRIPTION

Figure 1:
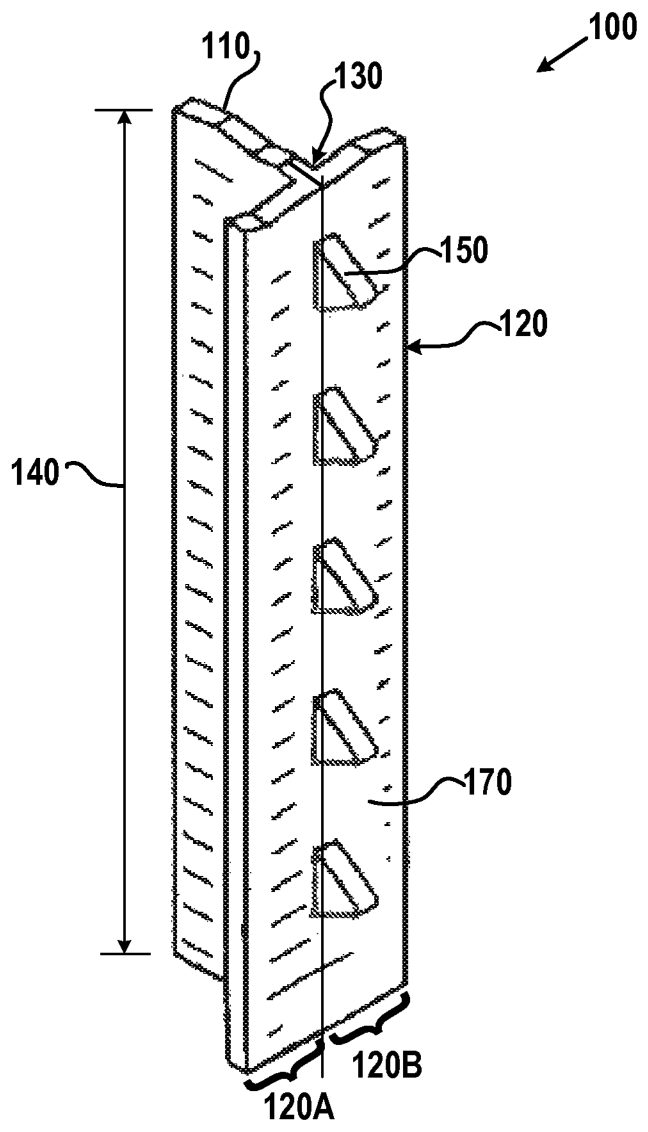
FIG. 1 (PRIOR ART)
FIG. 1 is a prior-art diagram of an example section of a fencing t-post.
Figure 2:
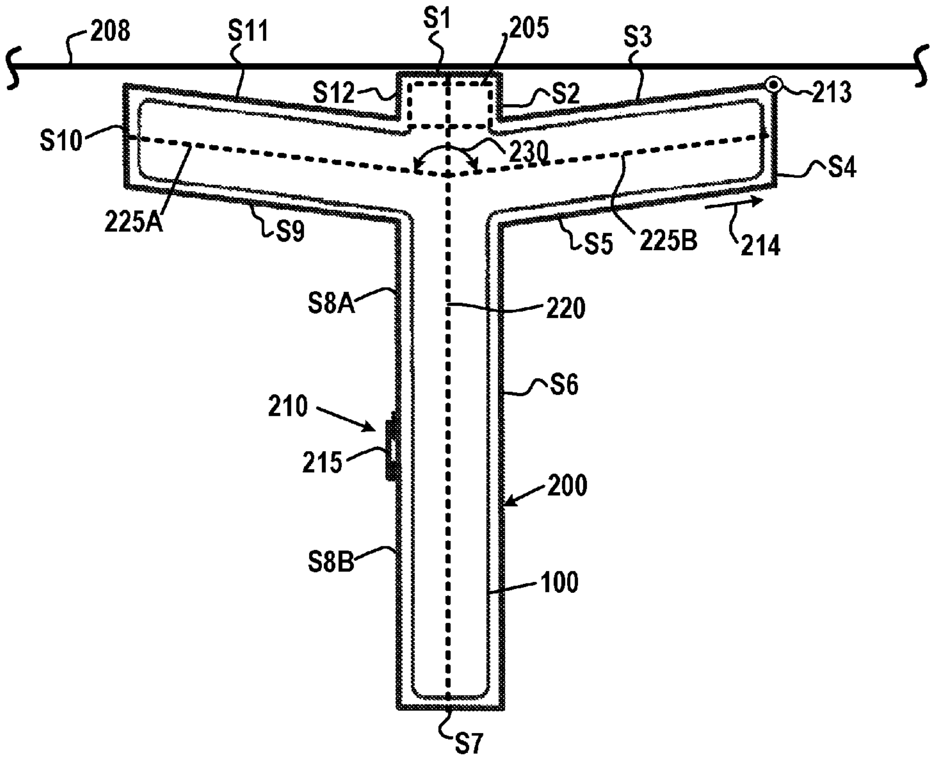
FIG. 2 is a cross-sectional diagram of a fence post (e.g., a t-post) shielded by an electrical insulator apparatus according to various example embodiments and shapes conforming to various fence post cross-sectional shapes.

FIG. 2 is a cross-sectional diagram of a fence post (e.g., the t-post 100 of FIG. 1) electrically insulated by an insulator apparatus 200 according to various example embodiments and shapes conforming to various fence post cross-sectional shapes. In the case of the example t-post 100 shown in cross-section inside the insulator apparatus 200, the insulator apparatus 200 forms a cross-shaped covering made up of sides 51 through S12. In the case of a t-post type of fence post such as the t-post 100, the cross hatch area 205 of FIG. 2 represents t-post nubs (e.g., the nubs 150 of FIG. 1) located along the insulated longitudinal section of the t-post 100 covered by the insulator apparatus 200.

However, it is noted that embodiments of the insulator apparatus 200 are each fabricated as a band of electrically insulating material to completely surround a section of fence post and thus to conform to the number and shapes of the sides of the fence post along a section of the fence post corresponding to the height of the insulating band. Thus, the insulator apparatus 200 may vary in shape and size according to the shape and size of the fence post. In the case of a round cross-sectional shaped fence post, for example, the band of the insulator apparatus 200 is formed in a rounded cross section to completely surround and grasp the round cross-sectional shaped fence post along a longitudinal section of the fence post.

The insulator apparatus 200 may be manufactured in various lengths, the length being the drawing dimension orthogonal to the drawing sheet surface and continuing downward from the drawing sheet surface. The insulator apparatus 200 is constructed as a band of electrically insulating material to position around a longitudinal section of a fence post such as to electrically insulate one or more conductive fencing wires 208 positioned perpendicular to the longitudinal section of the fence post to be insulated from the fencing wire(s) 208.

The band of the insulator apparatus 200 is fabricated from a plastic, composite, or other mechanically conformal and electrically insulating material of sufficient insulating strength to substantially prevent current flow from the charged fencing wire 208 through the fence post and to ground. The insulator apparatus 200 includes a lateral opening 210 along its length so that the flexible band of the insulator apparatus 200 may be bent open to install around the fence post prior to fastening as described below. Some embodiments of the insulator apparatus 200 may be hinged with one or of more hinges 213 positioned at one or more positions along the periphery 214 of the insulating band of the insulator apparatus 200. An axis of such hinge lies perpendicular to the periphery 214 of the band and facilitates installation around a fence post of large cross-sectional area to avoid excessively deforming or breaking the insulator apparatus 200 during installation.

Figure 3:
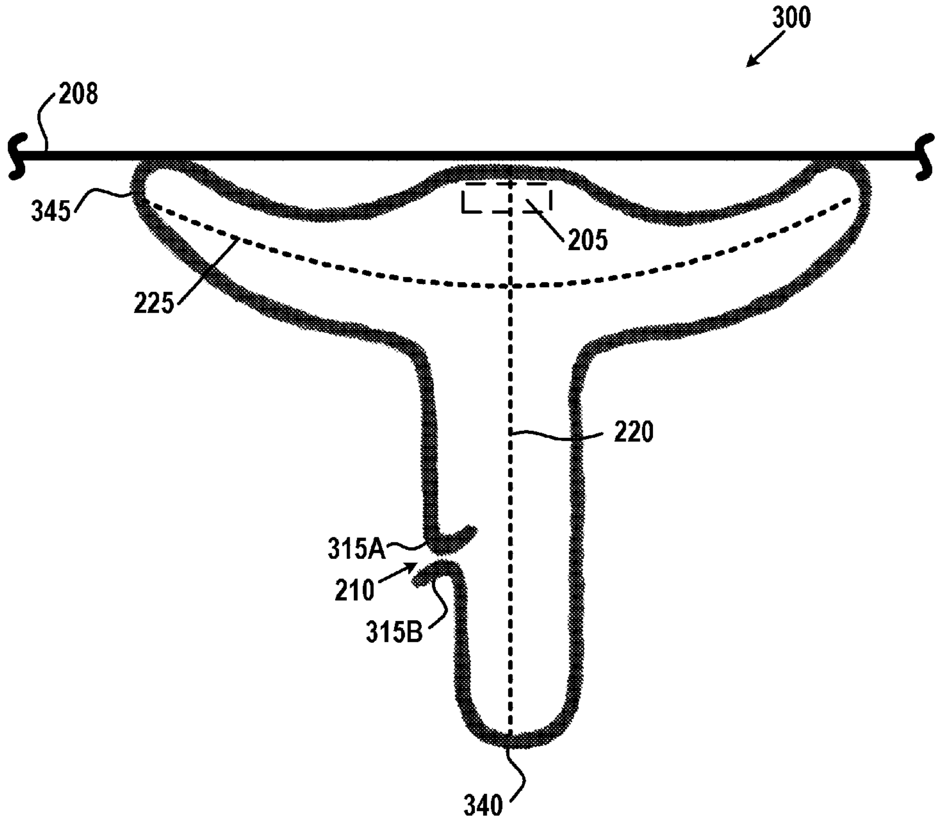
FIG. 3 is a cross-sectional diagram of a fence post insulator apparatus according to various example embodiments and shapes conforming to various fence post cross-sectional shapes.
Figure 4:
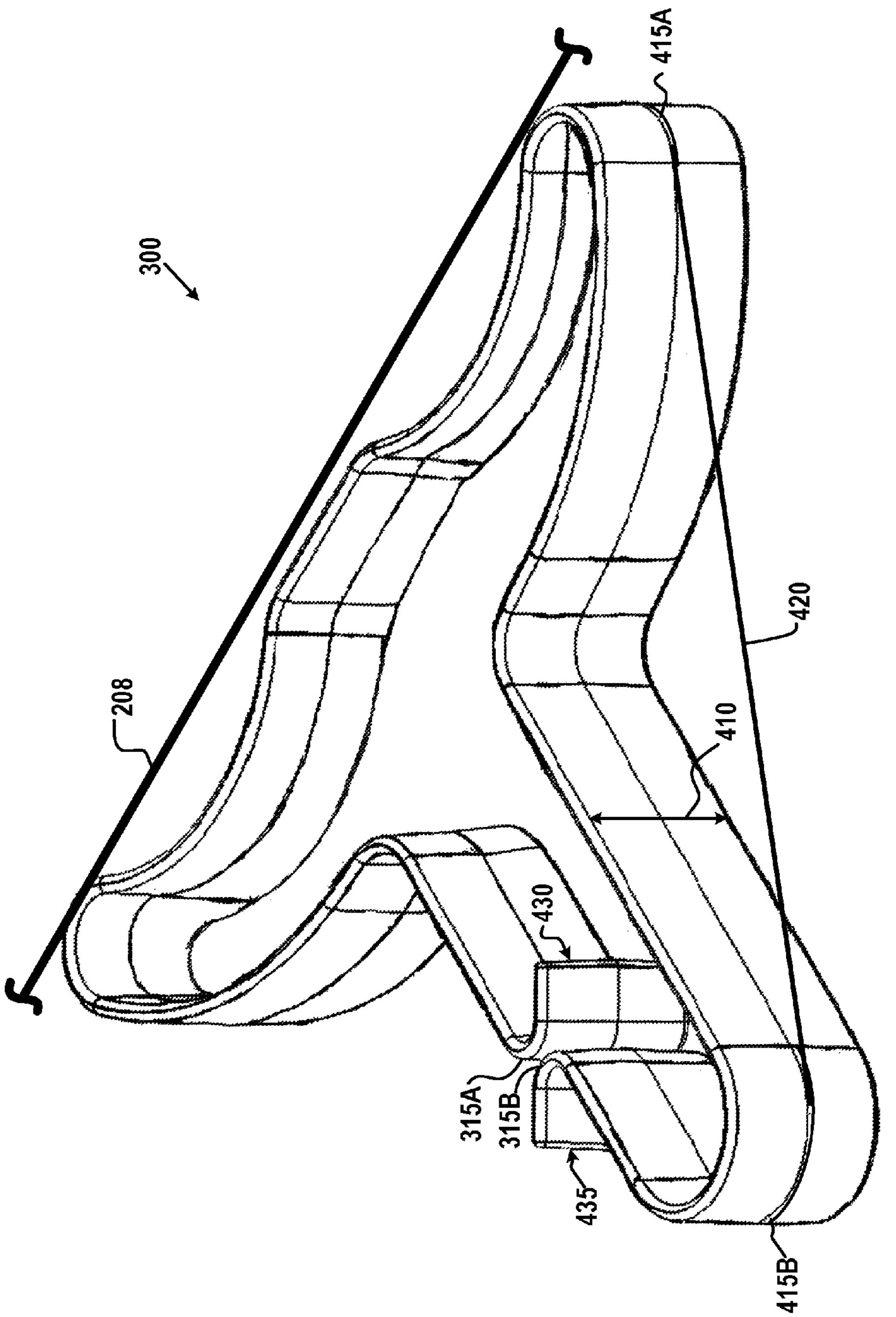
FIG. 4 is a perspective diagram a fence post insulator apparatus according to various example embodiments and shapes conforming to various fence post cross-sectional shapes.

Embodiments of the insulator apparatus 200 include one or more fastener(s) 215 to secure the insulator apparatus 200 at a selected longitudinal position along the length of the fence post. The fastener 215 may be of various types, including a hooked clip fabricated along one vertical edge of the insulator apparatus 200 to slide into a recess or around a raised edge fabricated at a matching position along the opposite vertical edge of the insulator apparatus 200. In some embodiments, the fastener 215 may include convex-curved extensions of the band of electrically insulating material forming the apparatus 200 as shown in FIGS. 3 and 4 as described below. The fastener 215 may alternatively include strap extensions of the insulator apparatus 200 and/or straps fabricated onto the insulator apparatus 200 at matching positions along each vertical edge of the insulator apparatus 200. Such straps may be fastened together to secure the insulator apparatus 200 to the fence post using buckles, hook and loop material, or any other strap fastener mechanism known in the art of strap fasteners. In the fastener closed position, the band of electrically insulating material completely surrounds the periphery of the fence post along the longitudinal section of fence post at which the insulating band is positioned.

FIG. 3 is a cross-sectional diagram of a fence post insulator apparatus 300 according to various example embodiments and shapes conforming to various fence post cross-sectional shapes. Some t-post designs are similar to the t-post 100 shown in FIG. 2 but utilize a cross member 120 that is slightly concave with respect to the nubs 150, as previously mentioned. It is noted that, unlike FIG. 2, FIG. 3 does not show a corresponding fence post cross-section except for the area 205 representing the nubs 150 of the fence post. The insulator apparatus 300 as shown in FIG. 3 is shaped to conform to the latter concave t-post design. However, the shapes of various embodiments of the insulator apparatus 300 may differ in order to conform to the shapes of various fence posts, as previously mentioned generally regarding various embodiments of the invention.

Some embodiments of the insulator apparatus 300 include hook-shaped perimeter ends 315A and 315B at the previously-mentioned lateral opening 210. The hook-shaped perimeter ends 315A and 315B are also referred to herein as "convex-curved extensions" and form an embodiment of the fastener 215 described with reference to FIG. 2. The insulator apparatus 300 is opened at the lateral opening 210 and temporarily deformed to install around a t-post or other fence post type at a desired height along the fence post. The hook-shaped perimeter ends 315A and 315B are then snapped together to retain the insulator apparatus 300 at the desired height along the fence post corresponding to the height above the ground of the fencing wire 208 to be energized.

FIG. 4 is a perspective diagram of the fence post insulator apparatus 300 according to various example embodiments and shapes conforming to various fence post cross-sectional shapes. It is noted that a longitudinal length 410 of the insulator apparatus 300 may vary according to the number of fencing wires to be insulated by a single insulator apparatus 300 and by an amount of anticipated vertical slippage of the fencing wire 208 upward and/or downward along the longitudinal length 410. Thus, for example, longer-length embodiments of the insulator apparatus 300 may be suitable for insulating multiple adjacent fencing wires. It is noted that the "longitudinal length" 410 is being referred to here as the dimension of the insulator apparatus 300 corresponding to a longitudinal dimension of a fence post section to be covered by and electrically insulated by the insulator apparatus 300. Longer-length embodiments may also reduce the likelihood of slippage of the fencing wire and/or the retaining wire off of the insulator apparatus 300 and onto the grounded fence post.

Longer-length embodiments may result in higher materials cost, however. Some embodiments of the insulator apparatus 300 may include lateral retaining slots (e.g., the lateral retaining slots 415A and 415B, also referred to as "grooves") fabricated into a portion of the thickness of the flexible band of the insulator apparatus 300. The retaining slots 415 may be fabricated at convex extension areas of the insulator apparatus 300 at positions where the fencing wire 208 and/or the above-described retaining wire (e.g., retaining wire section 420) are anticipated to contact the insulator apparatus 300 when the fencing wire 208 and the retaining wire are tensioned. The retaining slots 415 restrain slippage of the electric fence wire or the retaining wire relative to a position of the flexible band along the longitudinal section of the fence post to be insulated. The retaining slots 415 may improve the trade-off between reliability of maintaining the energized wires on the electrically insulating apparatus 300 and increased materials cost resulting from a longer length dimension 410.

Various embodiments of the insulator apparatus (e.g., the embodiments 200 and 300) may be fabricated according to various methods, including injection molding or extrusion followed by slicing a longer extruded product into shorter sections.

In some embodiments the electric fence insulator disclosed herein is of monolithic construction, fabricated as a flexible band of electrically insulating material of substantially uniform thickness, as illustrated in FIG. 4. The band is pre-formed into a hollow three-dimensional shape of a selected longitudinal length 410 and has a cross section shaped generally as a Latin cross when the insulator is in a closed configuration, as illustrated in FIG. 2. The cross section includes a longer cross member portion (e.g., with center line 220 as illustrated in FIGS. 2 and 3). The longer cross member portion bisects a shorter cross member portion (e.g., the shorter cross member portion of FIG. 2 consisting of two segments with center lines 225A and 225B).

The shorter cross member portion can be of different shapes. In some embodiments, a center line of the shorter cross member portion is substantially linear (not illustrated), in which case the longer cross member portion (e.g., with center line 220) perpendicularly bisects the shorter cross member portion. In some embodiments (e.g., the embodiment illustrated in FIG. 2), the shorter cross member portion includes two segments (e.g., the segment indicated by the center line 225A and the segment indicated by the center line 225B). In such case the longer cross member portion bisects an angle 230 formed between the two segments of the shorter cross member portion. In some embodiments (e.g., the embodiment illustrated in FIG. 3), the shorter cross member portion is curved (e.g., as indicated by the curved center line 225). In such case the longer cross member portion symmetrically bisects the curved shorter cross member portion.

The insulator has an opening 210 along a periphery of one of the cross member portions (e.g., as illustrated in FIGS. 2, 3 and 4) to facilitate installation around and immediately adjacent a longitudinal section of a fence post to be insulated. The opening is located interior any two adjacent end points of the longer cross member portion and the shorter cross member portion (e.g., the end point 340 of the longer cross member portion and the end point 345 of the shorter cross member portion of FIG. 3). The opening 210 and extends along the selected longitudinal length of the insulator (e.g., along the length 410 of the flexible band of FIG. 4).

A fastener clip is located at the opening 210 to affix the electric fence insulator apparatus at the longitudinal section of the fence post to be insulated. A first peripheral end of the flexible band is formed as a first convex-curved portion (e.g., the portion 315A of FIGS. 3 and 4) of the fastener clip. The first convex-curved portion extends along the selected longitudinal length 410. An edge 430 of the first peripheral end is directed inward toward an interior of the electric fence insulator apparatus. A second peripheral end of the flexible band is formed as a second convex-curved portion (e.g., the portion 315B of FIGS. 3 and 4) of the fastener clip. The second convex-curved portion extends along the selected longitudinal length 410. An edge 435 of the second peripheral end is directed outward, away from the interior of the electric fence insulator apparatus.

Embodiments herein are capable of preventing electrical contact between the longitudinal section of the fence post to be insulated and one or more electric fence wires when installed. Some embodiments of the electric fence insulator apparatus are capable of being installed around and immediately adjacent the longitudinal section of the fence post to be insulated.

The apparatus of various embodiments may be useful in applications other than providing electrical insulation of fencing and/or retaining wires from grounded fence posts used in electric fence applications. Thus, various embodiments of the invention are not to be so limited. The illustrations of the insulating apparatus 200 and 300 are intended to provide a general understanding of the structure of various embodiments. They are not intended to serve as a complete description of all the elements and features of apparatus and systems that might make use of the structures described herein. The novel apparatus of various embodiments may be incorporated into various systems and methods of fencing.

It is noted that activities described herein may be executed in an order other than the order described. The various activities described with respect to methods identified herein may also be executed in repetitive, serial, and/or parallel fashion.

Apparatus and methods described herein surround a longitudinal section of a grounded fence post with a band-shaped insulator apparatus with a lateral opening and a fastener at the opening. The insulator apparatus electrically insulates fencing wire and/or retaining wire positioned at the longitudinal section from the grounded fence post supporting the wire. Increased durability and reliability may result from the absence of or shortened length of a lever arm between the insulator and the fence post.

By way of illustration and not of limitation, the accompanying figures show specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

What is claimed is:

1. An electric fence insulator apparatus of monolithic construction, comprising:

a flexible band of electrically insulating material of substantially uniform thickness, the band pre-formed into a hollow three-dimensional shape of a selected longitudinal length and having a cross section shaped generally as a Latin cross in a closed configuration of the electric fence insulator apparatus, the cross section having a longer cross member portion bisecting a shorter cross member portion and having an opening along a periphery of one of the cross member portions, the opening located interior any two adjacent end points of the longer cross member portion and the shorter cross member portion and extending along the selected longitudinal length;

the electric fence insulator apparatus capable of being installed around and immediately adjacent a longitudinal section of a fence post to be insulated and capable of preventing electrical contact between the longitudinal section of the fence post to be insulated and at least one electric fence wire when installed;

a first peripheral end of the flexible band formed as a first convex-curved portion of a fastener clip located at the opening and extending along the selected longitudinal length, the fastener clip to affix the electric fence insulator apparatus at the longitudinal section of the fence post to be insulated, an edge of the first peripheral end directed inward toward an interior of the electric fence insulator apparatus; and a second peripheral end of the flexible band formed as a second convex-curved portion of the fastener clip, an edge of the second peripheral end directed outward, away from the interior of the electric fence insulator apparatus.

2. The electric fence insulator apparatus of claim 1, the longer cross member portion perpendicularly bisecting the shorter cross member portion, a center line of the shorter cross member portion being substantially linear.

3. The electric fence insulator apparatus of claim 1, the longer cross member portion bisecting an angle formed between two segments of the shorter cross member portion.

4. The electric fence insulator apparatus of claim 1, the longer cross member portion symmetrically bisecting a curve formed by the shorter cross member portion.

5. The electric fence insulator apparatus of claim 1, the electrically insulating material composed of at least one of a plastic or composite material.

6. The electric fence insulator apparatus of claim 1, the electrically insulating material to include a composition of fibers.

7. The electric fence insulator apparatus of claim 6, the composition of fibers to include carbon fibers.

8. The electric fence insulator apparatus of claim 1, the flexible band of electrically insulating material also being stretchable along at least a portion of the band.

9. The electric fence insulator apparatus of claim 1, the flexible band of electrically insulating material to include at least one lateral groove fabricated into a portion of a thickness of the flexible band along at least a portion of a periphery of the flexible band to retain at least one of the electric fence wire or a retaining wire to be wrapped over the electric fence wire and around the periphery of the flexible band to restrain slippage of the electric fence wire or the retaining wire relative to a position of the flexible band along the longitudinal section of the fence post to be insulated.

10. The electric fence insulator apparatus of claim 1, further including:

at least one hinge fabricated at a position along the periphery of the flexible band of electrically insulating material to assist in opening the band to install around a periphery of the fence post to be insulated and to avoid deformation stress of the band during installation, a longitudinal axis of the hinge oriented perpendicularly to the periphery of the flexible band.

* * * * *